(12) United States Patent
Herzinger

(10) Patent No.: US 11,500,060 B2
(45) Date of Patent: Nov. 15, 2022

(54) RADAR RECEIVER AND METHOD FOR RECEIVING A RADAR SIGNAL

(71) Applicant: Infineon Technologies AG, Neubiberg (DE)

(72) Inventor: Stefan Herzinger, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 481 days.

(21) Appl. No.: 16/378,822

(22) Filed: Apr. 9, 2019

(65) Prior Publication Data
US 2020/0025872 A1 Jan. 23, 2020

(30) Foreign Application Priority Data
Apr. 17, 2018 (DE) .......................... 102018109128.1

(51) Int. Cl.
*G01S 7/35* (2006.01)
*G01S 13/34* (2006.01)

(52) U.S. Cl.
CPC .............. *G01S 7/352* (2013.01); *G01S 13/34* (2013.01); *G01S 7/358* (2021.05)

(58) Field of Classification Search
CPC ........ G01S 7/4021; G01S 19/37; G01S 13/04; G01S 7/352; G01S 7/4004; G01S 3/043; G01S 7/358; G01S 19/13; G01S 7/03; G01S 7/032; G01S 7/2886; G01S 13/34; G01S 7/285; G01S 13/888; G01S 13/42; G01S 13/32; H03C 3/403; H04B 1/0028; H04B 1/16
USPC .................. 342/357.51, 194, 357.77, 357.76
See application file for complete search history.

(56) References Cited

U.S. PATENT DOCUMENTS

| | | | |
|---|---|---|---|
| 4,914,408 A | | 4/1990 | Voorman |
| 5,194,870 A | * | 3/1993 | Pearce ..................... G01S 13/34 342/128 |
| 6,049,573 A | * | 4/2000 | Song ...................... H03D 7/165 375/235 |

(Continued)

FOREIGN PATENT DOCUMENTS

| | | |
|---|---|---|
| DE | 102017211 558 A1 | 1/2018 |
| WO | WO2017187339 A1 | 11/2017 |

OTHER PUBLICATIONS

T. Zhang, V. Subramanian and G. Boeck, "CMOS K-band receiver architectures for low-IF applications," 2011 IEEE MTT-S International Microwave Workshop Series on Millimeter Wave Integration Technologies, Sitges, 2011, pp. 61-64.

*Primary Examiner* — Olumide Ajibade Akonai
(74) *Attorney, Agent, or Firm* — Harrity & Harrity, LLP

(57) ABSTRACT

Implementations of the present disclosure relate to a radar receiver for a real-valued analog RF radar signal. The radar receiver comprises a quadrature mixer circuit configured to generate, from the real-valued analog RF radar signal, a complex-valued analog signal comprising an inphase (I) signal component and a quadrature (Q) signal component, an analog polyphase filter configured to filter the I- and Q-signal components of the complex-valued analog signal to generate filtered I- and Q-signal components, and an analog-to-digital converter coupled to an output of the analog polyphase filter. The radar receiver is configured to convert only one of the filtered I- and Q-signal components from the analog to the digital signal domain.

20 Claims, 6 Drawing Sheets

(56) References Cited

U.S. PATENT DOCUMENTS

| | | | |
|---|---|---|---|
| 7,098,731 B1 | 8/2006 | Wyszynski et al. | |
| 7,170,440 B1* | 1/2007 | Beckner | G01S 7/024 |
| | | | 342/118 |
| 8,508,291 B1* | 8/2013 | Alzaher | H03H 11/1291 |
| | | | 327/553 |
| 10,009,203 B1* | 6/2018 | Sadeh-Shirazi | H04L 63/0227 |
| 11,036,237 B2* | 6/2021 | Fuchs | G01S 13/86 |
| 2005/0157826 A1* | 7/2005 | Vaananen | H04B 1/28 |
| | | | 375/350 |
| 2009/0103654 A1* | 4/2009 | van Waasen | H04L 27/3845 |
| | | | 375/318 |
| 2010/0013527 A1 | 1/2010 | Warnick et al. | |
| 2012/0105276 A1* | 5/2012 | Ryland | G01S 13/9017 |
| | | | 342/25 F |
| 2012/0147943 A1* | 6/2012 | Goodman | H04L 27/01 |
| | | | 375/232 |
| 2012/0283987 A1* | 11/2012 | Busking | G01S 13/825 |
| | | | 702/159 |
| 2013/0293411 A1 | 11/2013 | Dehlink et al. | |
| 2013/0342267 A1 | 12/2013 | Jalaleddine et al. | |
| 2015/0015431 A1* | 1/2015 | Trotta | G01S 7/03 |
| | | | 342/21 |
| 2015/0022394 A1* | 1/2015 | McConnell | H04B 1/7097 |
| | | | 342/357.51 |
| 2017/0353205 A1* | 12/2017 | Chakraborty | H03G 3/20 |
| 2018/0011181 A1* | 1/2018 | Urakawa | G01S 7/352 |
| 2019/0235050 A1* | 8/2019 | Maligeorgos | H03F 3/45179 |

\* cited by examiner

RADAR RECEIVER AND METHOD FOR RECEIVING A RADAR SIGNAL

RELATED APPLICATIONS

This application claims priority under 35 U.S.C. § 119 to German Patent Application No. 102018109128.1 filed on Apr. 17, 2018, the contents of which are incorporated by reference herein in their entirety.

FIELD

Implementations of the present disclosure relate to radar receivers and, more particularly, to methods and apparatuses for reducing radar receiver noise.

BACKGROUND

As for all radio receivers, radar receiver noise or noise figure is an important key performance parameter. Especially at mm wave frequencies in the 77-81 GHz range, noise reduction is hard to achieve and tightly limited by semiconductor device physics.

For the specific case of widely used frequency modulated continuous wave (FMCW) radar systems, there is a well-known architectural technique (in contrast to device and circuit level techniques) to achieve a close-to-3 dB noise improvement by utilizing quadrature RF down-conversion and complex signal processing throughout the receive signal chain. However, this approach is costly in terms of power consumption and hardware cost since many processing blocks have to be instantiated twice. The doubling of the processing chain starts at the radio frequency (RF) down-converter stage and propagates to all typical downstream stages like analog filters, analog gain stages, analog-to-digital conversion and subsequent digital signal processing (DSP).

SUMMARY

There is a desire to reduce hardware and DSP effort while maintaining the benefit for the receiver noise.

According to a first aspect of the present disclosure, it is provided a radar receiver for a real-valued analog RF radar signal. The radar receiver comprises a quadrature mixer circuit which is configured to generate, from the real-valued analog RF radar signal, a complex-valued analog signal comprising an inphase (I) signal component and a quadrature (Q) signal component. The radar receiver further comprises an analog polyphase filter which is configured to filter the I- and Q-signal components of the complex-valued analog signal to generate filtered I- and Q-signal components. An analog-to-digital converter is coupled to an output of the analog polyphase filter and the radar receiver is configured to convert only one of the filtered I- and Q-signal components from the analog to the digital signal domain.

In some example implementations, the analog polyphase filter is configured to have an asymmetric transfer function with respect to zero frequency. This allows a filtering operation that has a pass band in the positive (or negative) signal frequencies, and a stop band in the negative (or positive) signal frequencies and thus to achieve both image rejection and channel selection.

In some example implementations, a transition from a passband to a stopband of the analog polyphase filter comprises zero frequency (0 Hz). This means that the analog polyphase filter's transition band can contain 0 Hz, meaning that its passband ends in the positive (or negative) signal frequencies close to 0 Hz.

In some example implementations, the analog polyphase filter comprises an I-branch and a Q-branch, wherein the I-branch and the Q-branch are cross-coupled. This allows to generate complex filter poles.

In some example implementations, the output of the I-branch is coupled to the analog-to-digital converter and the output of the Q-branch is left open-circuited or terminated. Likewise, the output of the Q-branch is coupled to the analog-to-digital converter and the output of the I-branch is left open-circuited. This can lead to a real-valued signal with suppressed noise.

In some example implementations, the analog polyphase filter is an active RC polyphase filter. This can lead to feasible implementations.

In some example implementations, a filter order of the active RC polyphase filter is three or less, allowing adequate noise suppression with low hardware effort.

In some example implementations, the quadrature mixer circuit is configured to mix the real-valued analog RF signal with a FMCW signal to generate I- and Q-signal components of a beat-frequency signal. The proposed concept can be particularly useful for the FMCW radar principle.

In some example implementations, the FMCW signal comprises an asymmetric chirp. The proposed concept can be particularly useful for asymmetric chirps.

According to a further aspect of the present disclosure, it is provided an FMCW radar transceiver. The FMCW radar transceiver comprises a quadrature mixer circuit configured to generate a complex-valued analog beat-frequency signal from a local oscillator (LO) signal and a received FMCW radar signal. The FMCW radar transceiver further comprises an analog polyphase filter configured to filter I- and Q-signal components of the complex-valued analog beat-frequency signal to generate filtered I- and Q-beat-frequency signal components. The FMCW radar transceiver further comprises an analog-to-digital converter coupled to an output of the analog polyphase filter. The FMCW radar transceiver is configured to analog-to-digital convert only one of the filtered I- and Q-beat-frequency signal.

According to yet a further aspect of the present disclosure, it is provided a method for receiving a real-valued analog RF radar signal. The method includes mixing the real-valued analog RF radar signal with a complex-valued LO signal to generate a down-converted complex-valued analog signal comprising an I signal component and a Q signal component. The I- and Q-signal components of the down-converted complex-valued analog signal are filtered with an analog polyphase filter to generate filtered I- and Q-signal components. Only one of the filtered I- and Q-signal components is converted from the analog to the digital signal domain.

Implementations of the present disclosure can achieve similar noise performance as full blown quadrature radar receivers, however, at lower power consumption and cost.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

As for all radio receivers, radar receiver noise or noise figure is an important key performance parameter. Especially at millimeter (mm) wave frequencies (for example in the 76-81 GHz range) noise reduction is hard to achieve and tightly limited by semiconductor device physics.

Figure 1:
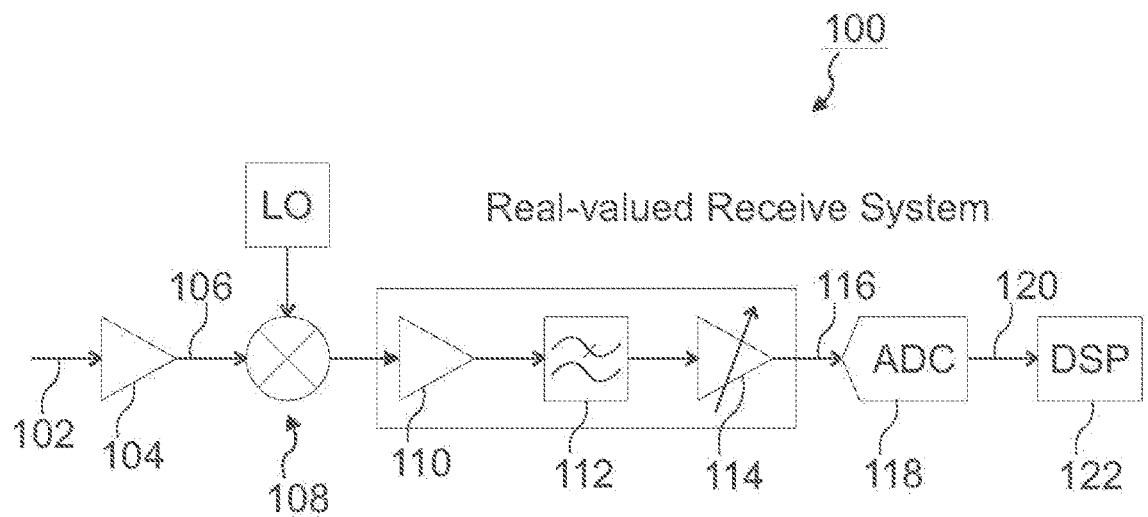
FIG. 1 shows an example of a real-valued radar receiver architecture.

A basic radar receiver architecture 100 employing a real-valued mixer with a real-valued baseband and analog-to digital converter (ADC) chain is shown in FIG. 1.

A received (real-valued) radar signal 102 can be fed from a receive antenna (not shown) to a low noise amplifier (LNA) 104 to obtain an amplified received radar signal 106. The amplified (real-valued) radar signal 106 can then be converted from the radio frequency (RF) domain to an intermediate frequency (IF) or baseband domain via a real-valued mixer 108. The resulting (real-valued) down-converted signal can then be fed through an optional amplifier 110, through a low-pass filter 112, and through a further optional variable gain amplifier 114. The resulting (real-valued) analog baseband signal 116 is then converted to the digital domain via an ADC 118. The resulting real-valued digital baseband signal 120 can then be further processed by digital baseband processing circuitry 122. For example, digital baseband processing circuitry 122 can perform a fast Fourier transform (FFT) on the real-valued digital baseband signal 120.

Figure 2:
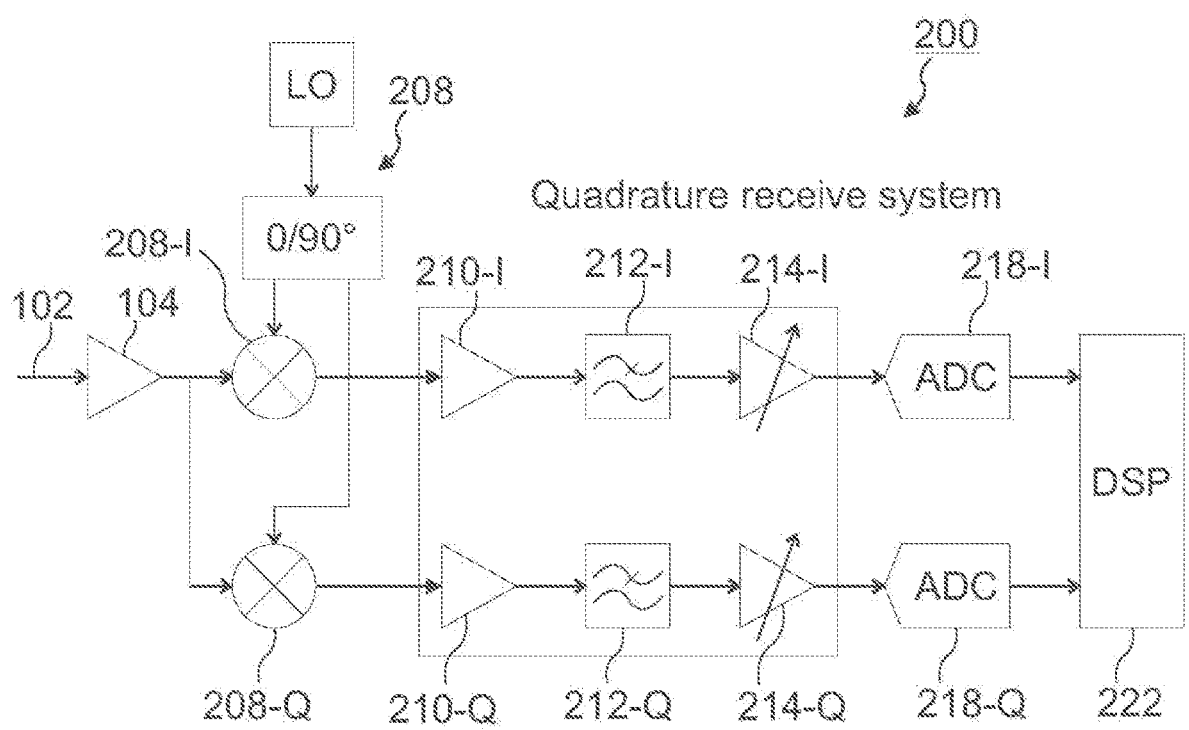
FIG. 2 shows an example of a complex-valued radar receiver architecture.

For the specific case of widely used frequency modulated continuous wave (FMCW) radar systems, there is a well-known architectural technique (in contrast to device and circuit level techniques) to achieve a close-to-3 dB noise improvement over the real-valued radar receiver architecture 100 of FIG. 1 by utilizing quadrature RF down-conversion and complex-baseband signal processing throughout the receive signal chain. A corresponding quadrature receiver architecture 200 is shown in FIG. 2.

Here, the amplified (real-valued) analog radar signal 106 is converted from the RF domain to the complex IF- or baseband domain via a quadrature mixer circuit 208. The analog RF radar signal 106 is split into a first component and a second component. The first component is forwarded to an inphase (I) mixer stage 208-I, while the second component is forwarded to a quadrature (Q) mixer stage 208-Q. The local oscillator (LO) signals used at the respective mixer stages 208-I, 208-Q are phase-shifted by 90°. The resulting I- and Q-components of the (complex-valued) down-converted signal can then be fed through respective optional amplifiers 210-I, 210-Q, through respective real-valued low-pass filters 212-I, 212-Q, and through respective further optional variable gain amplifiers 214-I, 214-Q. The resulting complex baseband signal components 216-I, 116-Q are then both converted to the digital domain via a respective ADC 218-I, 218-Q. The resulting digital complex baseband signal 120 can then be further processed by complex digital baseband processing circuitry 222.

While the real-valued radar receiver architecture 100 of FIG. 1 is more hardware efficient, this comes at cost of 3 dB more noise as positive sideband noise cannot be filtered out and is folded into the useful signal. The quadrature radar receiver architecture 200 of FIG. 2 requires RF LO I/Q generation (0/90° phase), quadrature (I/Q) down-converters, I/Q analog baseband circuitry, I/Q channel analog-digital-converters (ADCs), I/Q channel for digital signal processing. Thus, the quadrature approach of FIG. 2 is more costly in terms of power consumption and hardware cost, as many processing blocks, such as costly ADCs, have to be instantiated twice. The doubling of the processing chain starts at the RF down-converter stage and propagates to all typical downstream stages like analog filters, analog gain stages, analog-to-digital conversion and subsequent digital signal processing.

Implementations of the present disclosure can reduce the hardware and DSP effort significantly while maintaining the benefit for the receiver noise.

Figure 3:
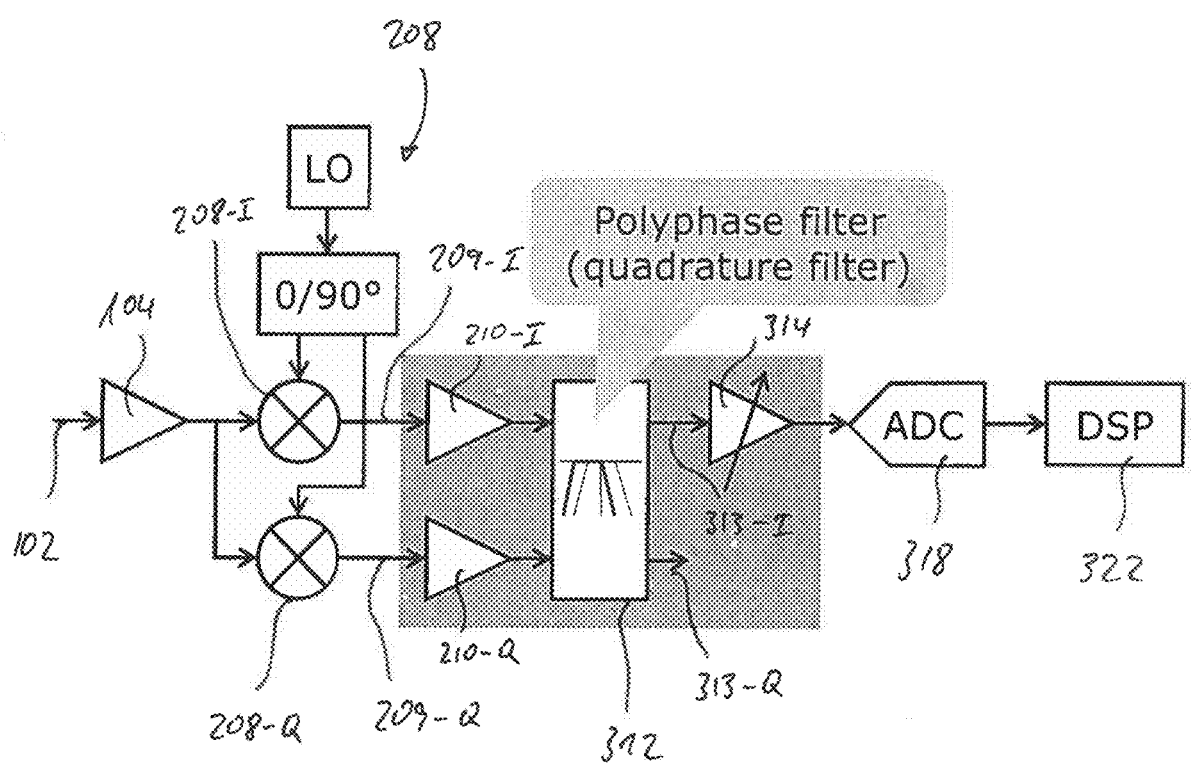
FIG. 3 shows an example of a radar receiver architecture according to implementations of the present disclosure.

FIG. 3 shows a high-level block diagram of a radar receiver 300 in accordance with implementations of the present disclosure.

The radar receiver 300 (e.g., an FMCW radar receiver) receives an analog RF radar signal 102. The skilled person having benefit from the present disclosure will appreciate that the RF signal 102 is a real-valued signal. Similar to the architecture of FIG. 2, radar receiver 300 comprises a quadrature mixer circuit 208 which is configured to generate, from the analog RF radar signal 102, a complex-valued analog signal 209 comprising an I signal component 209-I and a Q signal component 209-Q. The complex-valued analog signal 209 can be a complex-valued analog baseband signal or a complex-valued analog intermediate frequency (IF) signal. The I- and Q-components of the (complex-valued) down-converted signal 209 can then be fed through respective optional amplifiers 210-I, 210-Q. The radar receiver 300 further comprises an analog polyphase filter 312 which is configured to filter the I- and Q-signal components of the complex-valued analog signal 209 to generate filtered I- and Q-signal components 313-I, 313-Q. An ADC 318 is coupled to only one output of the analog polyphase filter 312, here via an optional variable gain amplifier 314. Said differently, the radar receiver 300 is configured to convert only one of the filtered I- and Q-signal components 313-I, 313-Q from the analog to the digital signal domain. In other words, only one of the filtered I- and Q-signal components 313-I or 313-Q is processed further, while the other component is not processed further and remains unused. In the illustrated example, the filtered I-signal component 313-I is processed further, while the filtered Q-signal component 313-Q is not processed further but terminated or left open-circuited. Thus, a costly ADC and complex digital baseband processing can be avoided compared to the quadrature radar receiver architecture 200 of FIG. 2

Some positive effects of the proposed radar receiver 300, in particular with regard to FMCW radar, will be explained in more detail in the following.

Figure 4:
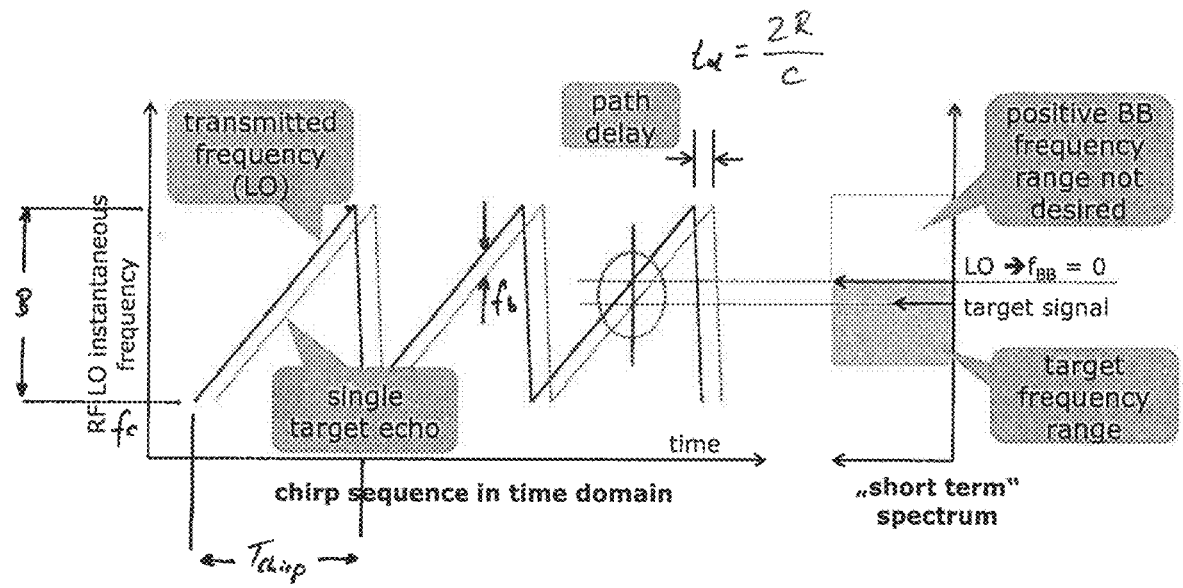
FIG. 4 illustrates an example FMCW saw tooth signal pattern.

As illustrated in FIG. 4, a transmitted FMCW radar signal can be a linear frequency-modulated continuous wave (L-FMCW) chirp sequence, whose frequency-vs-time characteristic can follow a saw-tooth pattern, for example. Other asymmetric chirp patterns are also possible. Asymmetric chirp patterns typically use only one part of the chirp for mixing and further processing. Dependent on the specific character of the chirp, either only the rising part or only the falling part of the chirp is used. The frequency $f_T(t)$ and phase $\phi_T(t)$ of the linear FMCW transmit chirp can be expressed as linear and quadratic functions of time $$f_T(t) = f_c \pm B^* t / T_{chirp}$$

$$\phi_T(t) = 2\pi f_c t \pm \pi B^* t^2 T_{chirp}.$$

While FIG. 4 shows an FMCW radar signal with increasing frequency during $T_{chirp}$ (i.e., $f_T(t)=f_c+B^*t/T_{chirp}$), the skilled person having benefit from the present disclosure will appreciate that the frequency could as well decrease during $T_{chirp}$, leading to $f_T(t)=f_c-B^*t/T_{chirp}$.

Figure 5:
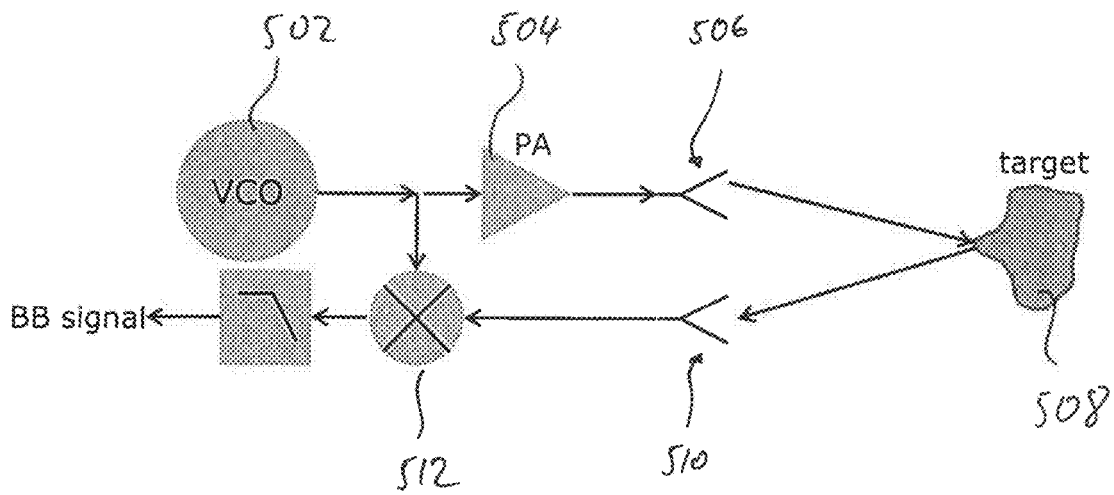
FIG. 5 shows a high-level block diagram of an FMCW radar transceiver.

In a typical FMCW radar implementation (see FIG. 5), a local oscillator (LO) module 502 can generate a linear frequency-modulated continuous wave signal, $\cos(\phi_T(t))$, which can be amplified by a transmit power amplifier (PA) 504 and transmitted from transmit antenna 506. Any object(s) 508 present in a region of interest illuminated by the radar reflect the transmitted signal. A receive antenna 510 can receive the reflected signal and an LNA (not shown) can amplify it. This received signal is mixed with the LO signal in mixer stage 512 to produce a beat-frequency output, which is digitized by an ADC and subsequently processed by a DSP (e.g., a DSP circuit). As mentioned before, there are several possible radar receiver architectures for this purpose.

FIG. 4 (right) schematically also illustrates the nature of the received FMCW signal, which comprises a delayed (and attenuated) copy of the transmit signal, the delay and attenuation corresponding to the object 508. The skilled person having benefit from the present disclosure will appreciate that the beat-frequency signal corresponding to the object 508 is a tone (ignoring the edge effects at the start and end of the chirp), whose frequency, $f_b$, is proportional to the distance of the object from the radar, R. Therefore, the process of detecting objects (targets) and their respective distances from the radar typically involves taking a fast Fourier transform (FFT) of the beat-frequency signal and identifying peaks that stand out from the noise floor. Typically, closer objects will cause higher peaks closer to 0 Hz, while objects farther away will cause lower peaks farther away from 0 Hz.

FIG. 4 also indicates the target frequency range of the receive (RX) and beat-frequency (IF) signals. The target frequency range contains delayed and attenuated versions of the LO signal representing different targets. The signal of interest is contained in the "in-band" portion of the RX signal spectrum (here: negative frequencies), while the "image band" portion of the spectrum (here: positive frequencies) is devoid of any signal of interest. This is because the received signal is always "delayed" with respect to the transmit LO signal. Therefore, the beat frequency corresponding to different objects always falls on one side of the complex-baseband spectrum—which side depends on whether up-chirps or down-chirps are used. A thermal noise floor is spread across both the in-band and image band.

When using a real-valued mixer and real-valued baseband chain (as in FIG. 1), the IF or baseband signal spectrum after the mixer suffers from image-band noise fold back. In other words, the IF or baseband signal experiences a signal-to-noise (SNR) ratio loss caused by noise from both the in-band and image band. This leads to a performance loss of up to 3 dB that is avoidable with a complex-baseband chain as illustrated in FIG. 2. Since the RX signal is mixed with $\cos(\phi_T(t))+j\sin(\phi_T(t))$ in a quadrature mixer, the in-band and image bands remain separate, and there is no noise increase due to image-band noise fold back. Thus, there is an overall noise-figure advantage possible with the architecture of FIG. 2.

Figure 6:
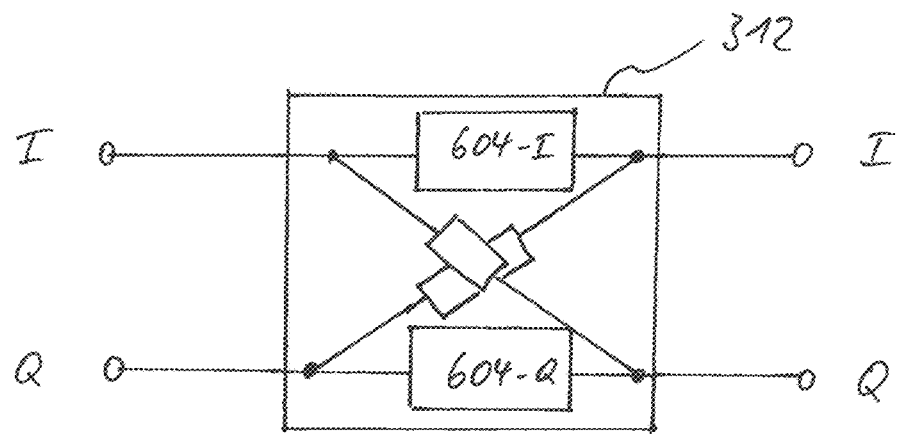
FIG. 6 shows a high-level block diagram of an analog polyphase filter.

With implementations of the present disclosure, advantages of the real-valued radar receiver architecture 100 of FIG. 1 can be combined with advantages of the complex-valued radar receiver architecture 200 of FIG. 2. This can be achieved by using the complex-valued analog polyphase filter 312, which can also be referred to as analog quadrature filter, and discarding or not further using one of its outputs (I or Q). The resulting asymmetrical polyphase filtering operation can have a pass band in the negative signal frequencies, and a stop band in the positive signal frequencies, to achieve both image rejection and channel selection. A pass band in the positive signal frequencies, and a stop band in the negative signal frequencies is also possible, of course. A schematic block diagram of the analog polyphase filter 312 is shown in FIG. 6.

The analog polyphase filter 312 comprises an input 602-I for an analog I-signal component and an input 602-Q for an analog Q-signal component representing real part and imaginary part of signal 309. This can be single-ended or symmetrical inputs, depending on the circuit layout. The inputs 602-I, 602-Q can be directly or indirectly coupled to respective outputs of quadrature mixer circuit 208. Input 602-I can be regarded as an input of an I-branch 604-I of polyphase filter 312 and input 602-Q can be regarded as an input of a Q-branch 604-Q of polyphase filter 312. The I-branch 604-I and Q-branch 604-Q of polyphase filter 312 can comprise one or more analog low-pass filter stages or sections, respectively. It has been found that polyphase filters of $3^{rd}$ order or even less may already be sufficient to obtain adequate effects. The polyphase filter 312 can be based on various kinds of active RC filters, e.g. Tow-Thomas low pass filter, ladder-type filter, or others. The I-branch 604-I and Q-branch 604-Q of polyphase filter 312 can be cross-coupled, which means that one or more circuit nodes of the I-branch 604-I are coupled to one or more circuit nodes of the Q-branch 604-Q. Likewise, one or more circuit nodes of the Q-branch 604-Q can be coupled to one or more circuit nodes of the I-branch 604-I. In some example implementations, an input of a filter stage of the I-branch 604-I can be coupled to an output of a corresponding filter stage in the Q-branch 604-Q, and vice versa. For example, an input of a first filter stage of the I-branch 604-I can be coupled to an output of the first filter stage in the Q-branch 604-Q, and vice versa, an input of an optional second filter stage of the I-branch 604-I can be coupled to an output of the second filter stage in the Q-branch 604-Q, and vice versa, an so on.

Figure 7:
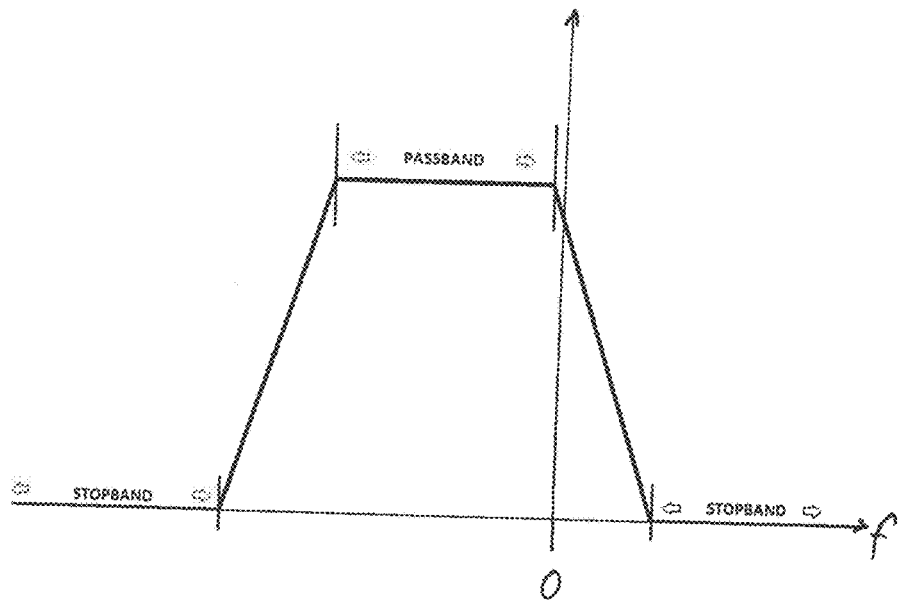
FIG. 7 illustrates an asymmetric filter transfer function with respect to 0 Hz.

In example implementations, the analog polyphase filter 312 is configured to have an asymmetric transfer function with respect to zero frequency (0 Hz). In other words, the analog polyphase filter's frequency transfer function can be spectrally asymmetric. In particular, a transition from the analog polyphase filter's passband to stopband can contain 0 Hz. In such implementations the analog polyphase filter's passband can be in the negative or positive half-plane of the frequency spectrum. This is shown in FIG. 7, schematically illustrating the analog polyphase filter's 312 passband in the negative half-plane of the frequency spectrum, its stopband in the positive half-plane of the frequency spectrum, and a transition band containing 0 Hz in between. The passband is the range of frequencies that can pass through a filter. In contrast, the stopband is a band of frequencies, between specified limits, through which a filter does not allow signals to pass, or its attenuation is above the required stopband attenuation level. Depending on application, the required attenuation within the stopband may typically be a value between 20 and 120 dB higher than the nominal passband attenuation, which often is 0 dB. The lower and upper limiting frequencies, also denoted lower and upper stopband corner frequencies, are the frequencies where the stopband and the transition bands meet in a filter specification. The stopband of a low-pass filter is the frequencies from the stopband corner frequency (which is slightly higher than the passband 3 dB cut-off frequency) up to the infinite frequency.

Figure 8:
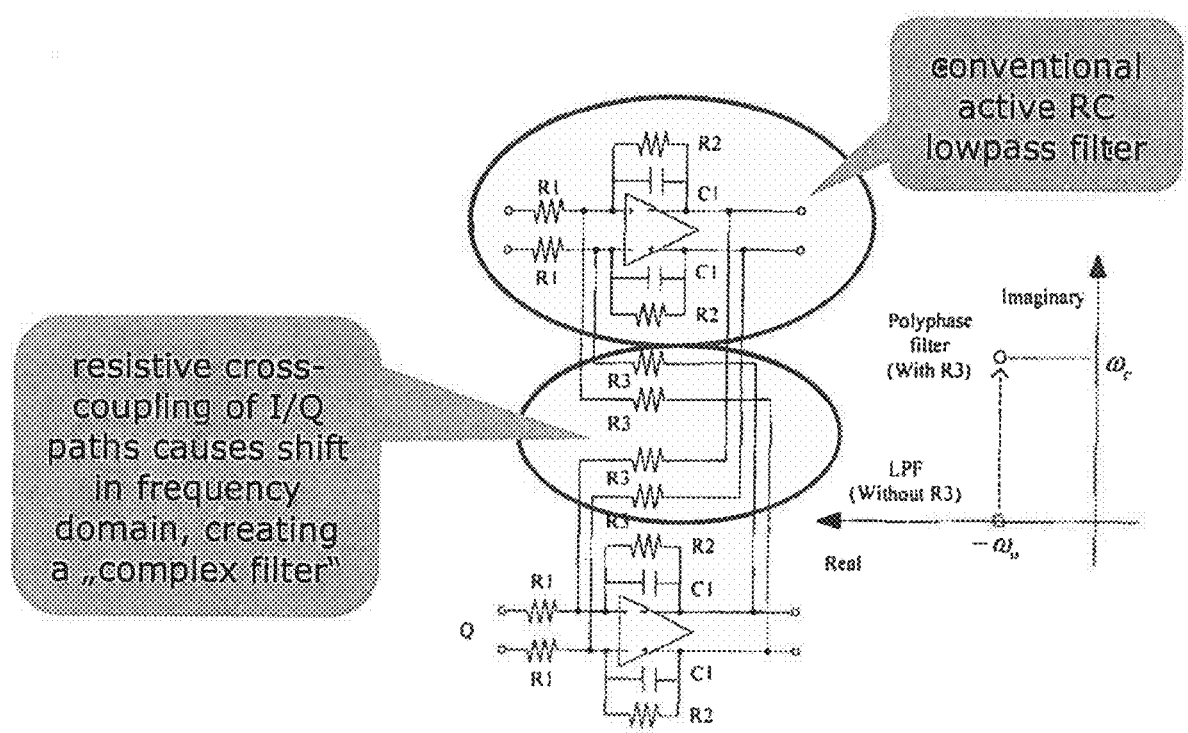
FIG. 8 shows an example of a first order active RC polyphase filter.

In some examples, the analog polyphase filter 312 can be implemented using active RC low pass filters in the I-branch 604-I as well as in the Q-branch 604-Q. One such example of an active RC polyphase filters having a single complex pole is illustrated in FIG. 8. Higher order filters can be synthesized by cascading first order sections. It can be seen that the output of the first order I-section is coupled (via resistors R3) to the input of the first order Q-section, and that the output of the first order Q-section is coupled to the input of the first order I-section. Thus, the I- and Q-component filters can be cross-coupled via resistors (R3) in some implementations. A ratio of the cross-coupling resistors R3 to filter resistors R1, R2 determines the frequency shift of the filter transfer function. The orientation of the cross-coupling defines the direction of shift (towards positive or negative frequencies).

To avoid any confusion with filters sometimes referred to as a "digital polyphase filters", it is to be noted here that a "digital polyphase filter" is constructed different and has a different behavior and different functionality compared to the above described analog polyphase filter.

Figure 9:
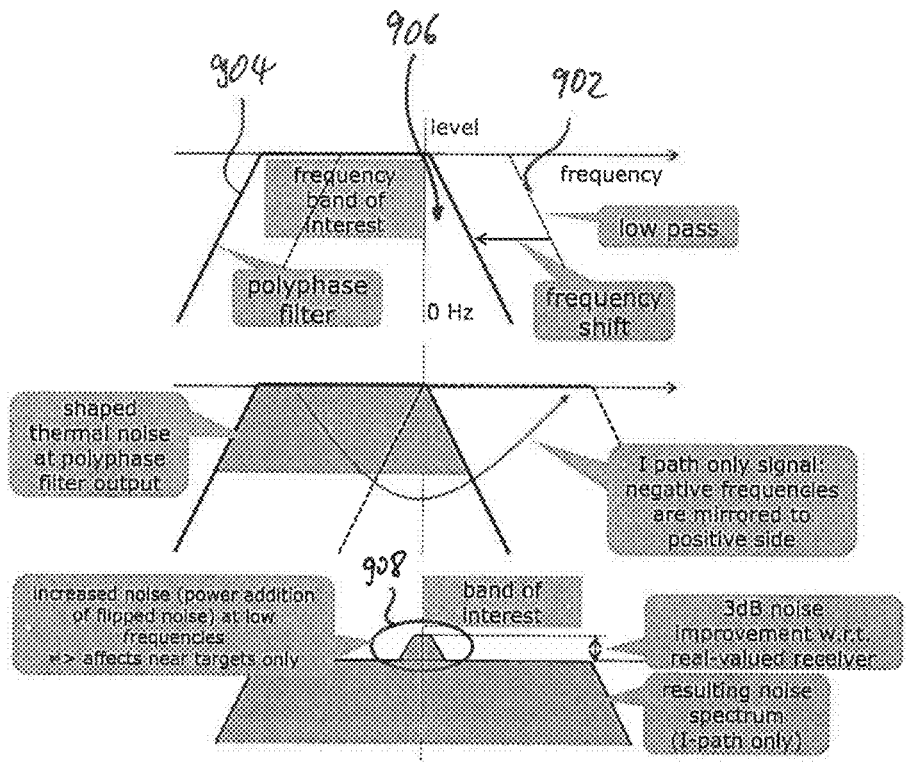
FIG. 9 illustrates the effect an analog polyphase filter has on noise.

FIG. 9 illustrates the effect of using an analog polyphase filter instead of using an analog low pass filter.

For FMCW radar systems utilizing frequency up-chirps only negative frequencies are of interest (given by causality). While a transfer function 902 of a low pass filter is symmetric with respect to 0 Hz, a transfer function 904 of an analog polyphase filter is asymmetric with respect to 0 Hz. In the illustrated example, a passband of transfer function 904 is in the negative frequency region of interest with a corner or cutoff frequency being located substantially at 0 Hz. Thus, by using an analog polyphase filter with the pass-band shifted to negative frequencies, the positive (or negative) side noise can be suppressed. Right after suppressing the positive (or negative) frequency side noise, the Q- (or I-) path processing can be completely dropped. For the illustrated example received spectrum this means that negative frequency spectrum is flipped to positive side and added to positive frequency spectrum (reflecting that the spectrum of a real signal, I only, has to be symmetric with respect to 0 Hz). But as positive side noise is suppressed it does not significantly contribute to total noise anymore, which effectively leads to a close to 3 dB improvement of noise.

Given practical filter implementations of finite order, the proposed radar receiver architecture of FIG. 3 does not work perfectly in the polyphase filter transition region 906, as suppression is low there. This effect is marked with reference numeral 908. But with a suitably designed filter (transfer functions depicted in FIG. 9), the frequency range close to 0 Hz showing no or only little noise improvement falls in the region of radar near targets (low IF frequencies), where reflected signal levels are very large anyway and noise performance is not relevant to radar system performance.

Figure 10:
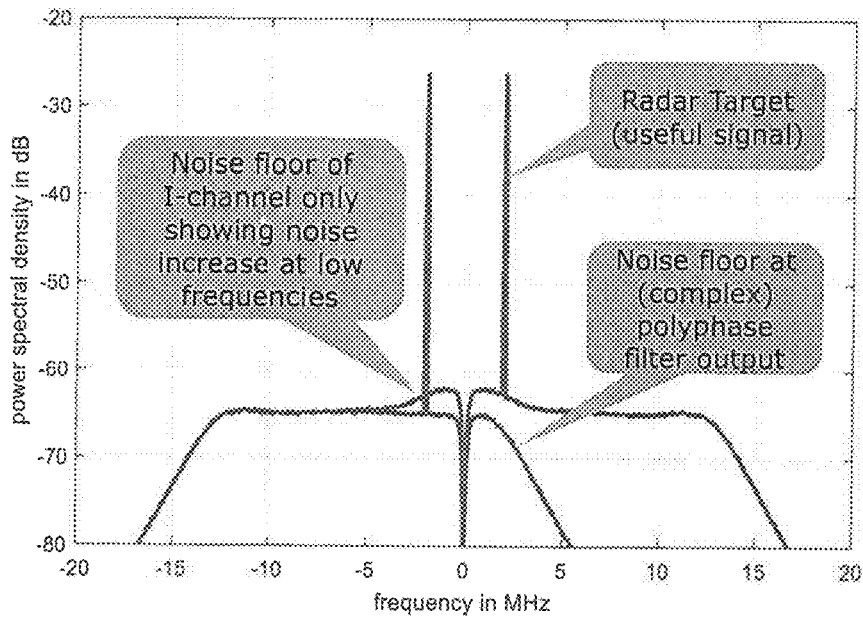
FIG. 10 shows an example of a resulting radar RX frequency spectrum.

FIG. 10 shows a noise floor simulation result using a typical $3^{rd}$ order Chebyshev type filter for a useful frequency band as typically used in today's radar systems. It can be seen that $3^{rd}$ order is a reasonable low order for an active analog filter as seen in many receiver systems today. The zero in the depicted transfer function at 0 Hz is due to filtering the radar LO signal.

To summarize, implementations of the present disclosure may use a quadrature downconverter and an analog polyphase filter connected downstream to it. In contrast to the known quadrature receiver solution, any further processing of the Q-path (amplifiers, further filters, ADC, etc.) can be omitted. The intended noise improvement leading to improved performance of the radar system is substantially not affected by this removal. Assuming same physical noise limitations from circuits and semiconductor devices, implementations of the present disclosure can allow radar products to achieve similar noise performance as radar products utilizing full blown quadrature receivers at significantly lower power consumption and cost.

The aspects and features mentioned and described together with one or more of the previously detailed examples and figures, may as well be combined with one or more of the other examples in order to replace a like feature of the other example or in order to additionally introduce the feature to the other example.

Although specific implementations have been illustrated and described herein, it will be appreciated by those of ordinary skill in the art that a variety of alternative and/or equivalent implementations may be substituted for the specific implementations shown and described without departing from the scope of the present implementation. This application is intended to cover any adaptations or variations of the specific implementations discussed herein. Therefore, it is intended that this implementation be limited only by the claims and the equivalents thereof.

A functional block denoted as "means for . . . " performing a certain function may refer to a circuit that is configured to perform a certain function. Hence, a "means for performing a task" may be implemented as a "means configured to or suited for performing the task", such as a device or a circuit configured to or suited for the task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A radar receiver for a real-valued analog radio frequency (RF) radar signal, the radar receiver comprising:
   a quadrature mixer circuit configured to generate, from the real-valued analog RF radar signal, a complex-valued analog signal comprising an inphase (I) signal component and a quadrature (Q) signal component;
   an analog polyphase filter configured to filter the I-signal component and the Q-signal component, of the complex-valued analog signal, to generate a filtered I-signal component, corresponding to the I-signal component, and a filtered Q-signal component, corresponding to the Q-signal component, respectively,
      wherein the analog polyphase filter comprises an I-branch and a Q-branch that are cross-coupled, and
      wherein the analog polyphase filter comprises a passband, stopband and a transition band, the transition band comprising a zero frequency; and
   an analog-to-digital converter coupled to convert only one of the filtered I-signal component or the filtered Q-signal component from an analog signal domain to a digital signal domain.

2. The radar receiver of claim 1, wherein the analog polyphase filter is configured to have an asymmetric transfer function with respect to zero frequency.

3. The radar receiver of claim 1, wherein an output of the I-branch is coupled to the analog-to-digital converter and an output of the Q-branch is open-circuited, or vice versa.

4. The radar receiver of claim 1, wherein the analog polyphase filter is an active resistor-capacitor (RC) polyphase filter.

5. The radar receiver of claim 4, wherein a filter order of the active RC polyphase filter is three or less.

6. The radar receiver of claim 1, wherein the quadrature mixer circuit is configured to mix the real-valued analog RF radar signal with a frequency modulated continuous wave (FMCW) signal to generate the I-signal component and the Q-signal component of a beat-frequency signal.

7. The radar receiver of claim 6, wherein the FMCW signal comprises an asymmetric chirp.

8. A frequency modulated continuous wave (FMCW) radar receiver, comprising:
   a quadrature mixer circuit configured to generate, from a local oscillator (LO) signal having an asymmetric chirp and a received FMCW radar signal, a complex-valued analog beat-frequency signal;
   an analog polyphase filter configured to filter an inphase (I) signal component and a quadrature (Q) signal component, of the complex-valued analog beat-frequency signal, to generate a filtered I-beat frequency signal component and a filtered Q-beat frequency signal component, respectively,
      wherein the analog polyphase filter comprises an I-branch and a Q-branch that are cross-coupled, and
      wherein the analog polyphase filter comprises a passband, stopband and a transition band, the transition band comprising a zero frequency; and an analog-to-digital converter coupled to convert only one of the filtered I-beat frequency signal component or the filtered Q-beat frequency signal component to form an analog-to-digital converted beat-frequency signal component.

9. The FMCW radar receiver of claim 8, wherein the analog polyphase filter is an active resistor-capacity (RC) polyphase filter.

10. The FMCW radar receiver of claim 8, further comprising:
a digital signal processing circuit configured to process the analog-to-digital converted beat-frequency signal component.

11. The FMCW radar receiver of claim 8, wherein the analog polyphase filter is configured to have an asymmetric transfer function with respect to zero frequency.

12. The FMCW radar receiver of claim 8, wherein the analog polyphase filter is an active resistor-capacitor (RC) polyphase filter.

13. The FMCW radar receiver of claim 12, wherein a filter order of the active RC polyphase filter is three or less.

14. A method for receiving a real-valued analog radio frequency (RF) radar signal, the method comprising:
mixing the real-valued analog RF radar signal with a complex-valued RF signal to generate a down-converted complex-valued analog signal comprising an inphase (I) signal component and a quadrature (Q) signal component;
filtering, by an analog polyphase filter comprising an I-branch and a Q-branch that are cross-coupled, the I-signal component and the Q-signal component, of the down-converted complex-valued analog signal, to generate a filtered I-signal component and a filtered Q-signal component, respectively, wherein the analog polyphase filter comprises a passband, stopband and a transition band, the transition band comprising a zero frequency; and
converting, by an analog-to-digital converter coupled to only one of the filtered I-signal component or the filtered Q-signal component, from an analog signal domain to a digital signal domain to form an analog-to-digital converted filtered signal component in the digital signal domain.

15. The method of claim 14, further comprising:
processing the analog-to-digital converted filtered signal component in the digital signal domain.

16. The method of claim 14, wherein the analog polyphase filter has an asymmetric transfer function with respect to zero frequency.

17. The method of claim 14, wherein the analog polyphase filter is an active resistor-capacitor (RC) polyphase filter.

18. The method of claim 17, wherein a filter order of the active RC polyphase filter is three or less.

19. The method of claim 14, wherein the mixing comprises quadrature mixing the real-valued analog RF radar signal with a complex-valued frequency modulated continuous wave radar signal.

20. The method of claim 14, wherein converting only one of the filtered I-signal component or the filtered Q-signal component comprises:
coupling a first output of only one of the I-branch or the Q-branch to the analog-to-digital converter, and
terminating a second output of another one of the I-branch or Q-branch.

* * * * *